United States Patent
Wu (10) Patent No.: US 8,170,576 B2
(45) Date of Patent: May 1, 2012

(54) NETWORK ORIENTED SPECTRUM SHARING SYSTEM

(75) Inventor: Shiquan Wu, Ottawa (CA)

(73) Assignee: Shiquan Wu, Ottawa (CA)

( * ) Notice: Subject to any disclaimer, the term of this patent is extended or adjusted under 35 U.S.C. 154(b) by 843 days.

(21) Appl. No.: 11/560,336

(22) Filed: Nov. 15, 2006

(65) Prior Publication Data
US 2008/0112361 A1    May 15, 2008

(51) Int. Cl.
*H04W 72/00*    (2009.01)
*H04B 7/00*    (2006.01)

(52) U.S. Cl. .................................. 455/454; 455/509

(58) Field of Classification Search .................. 455/454, 455/450, 464, 509
See application file for complete search history.

(56) References Cited

U.S. PATENT DOCUMENTS

| | | | | |
|---|---|---|---|---|
| 5,761,621 | A * | 6/1998 | Sainton | 455/453 |
| 7,602,697 | B2 * | 10/2009 | Kowalski | 370/208 |
| 7,653,396 | B2 * | 1/2010 | van der Gaast et al. | 455/450 |
| 2005/0237988 | A1 * | 10/2005 | Webster et al. | 370/343 |
| 2006/0072471 | A1 * | 4/2006 | Shiozawa | 370/248 |
| 2007/0091998 | A1 * | 4/2007 | Woo et al. | 375/240.02 |
| 2007/0135109 | A1 * | 6/2007 | Walter et al. | 455/415 |

* cited by examiner

*Primary Examiner* — Nick Corsaro
*Assistant Examiner* — Joel Ajayi (57) ABSTRACT

There is provided a system and method for sharing a wireless spectrum compromising a first transceiver for establishing the communication channels within the allocated bandwidth using a first protocol, a broker for determining the unused bandwidth within the allocated bandwidth, and a second transceiver for establishing the further communication channels within the unused allocated bandwidth using a second protocol. The first protocol is UMTS and the second protocol is WiMax. The broker may monitor UMTS traffic and allocate bandwidth to WiMax traffic whenever resources are idle or traffic are low or allocate bandwidth in dependence upon time division multiplexing, or frequency division multiplexing or may overlap a WiMax signal with a UMTS signal.

23 Claims, 8 Drawing Sheets

1 The "Broker" acquires/negotiates the radio resources allocation information from UMTS RRM unit
2 Inform WiMax RRM unit of which frames are available. The availability means either there is no traffic on those time frames or the traffic is very low
3 WiMax RRM unit assign those time frames available to WiMax terminals
4 WiMax RRM unit notices "Broker" of its decision
5 "Broker" make Rendez-vous with UMTS RRM unit

NETWORK ORIENTED SPECTRUM SHARING SYSTEM

FIELD OF THE INVENTION

The present invention relates to methods and apparatuses for spectrum sharing in a wireless system.

BACKGROUND OF THE INVENTION

Spectrum is a limited and precious resource for wireless communications. Currently all the golden spectrum have been allocated and utilized. However, demand for extra capacity seems endless. According to statistics, only 20% of the licensed spectrum is in use in any moment.

Software Defined Radio (SDR) is a concept to build a radio in software form so that one design can serve multiple standards, multiple air interfaces. With a software defined radio, most of the parameters, such as modulation schemes and coding schemes, bandwidth or sampling rate, filtering etc can be changed in software. Therefore software defined radio needs a very high sampling rate analogue-to-digital (ADC) to handle a variety of bandwidth from very narrow band (GSM 200 kHz) to very wide band (WiMax 20 MHz). SDR also needs a very powerful processor to handle from very low data rate (SMS, speech) to very high data rate (100 Mbps). Since its first inception in 1995 (first demo for a military project) [1], SDR has been one of the major research and development areas. FCC has adopted changes to the equipment authorization rules to accommodate SDR [2]. However, after more than 10 years of research and development, the perception on SDR is still perceived to be worthwhile.

3rd Generation Partnership Project (3GPP) is a collaboration agreement (established in 1998) among many countries and is the organization responsible for building a globally applicable 3rd generation mobile wireless communication system. A system based upon this 3rd generation system is also known as a Universal Mobile Telecommunication System (UMTS).

Figure 1:
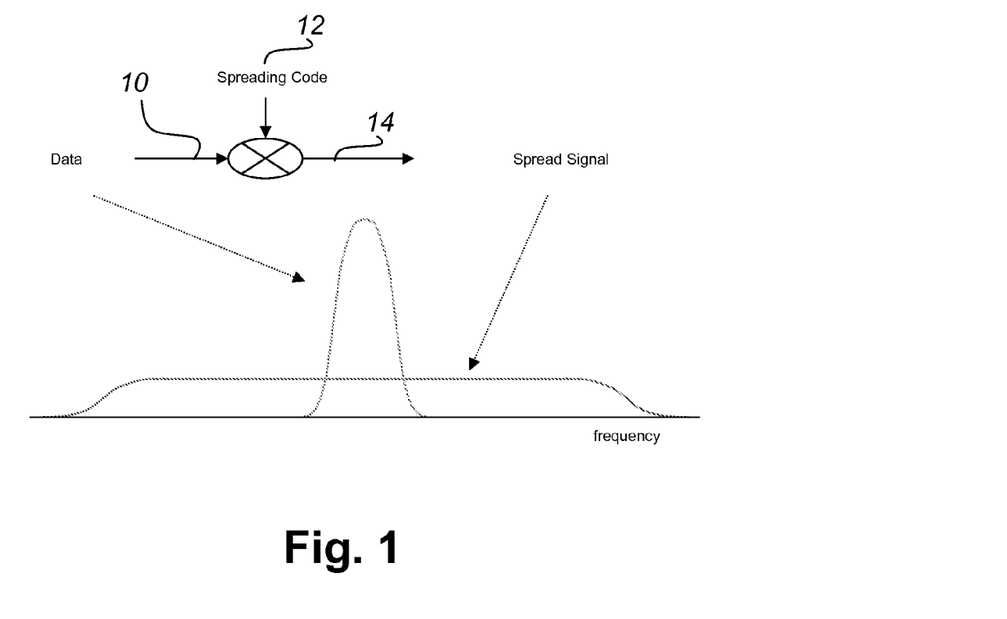
FIG. 1 graphically illustrates spectrum spreading.
Figure 2:
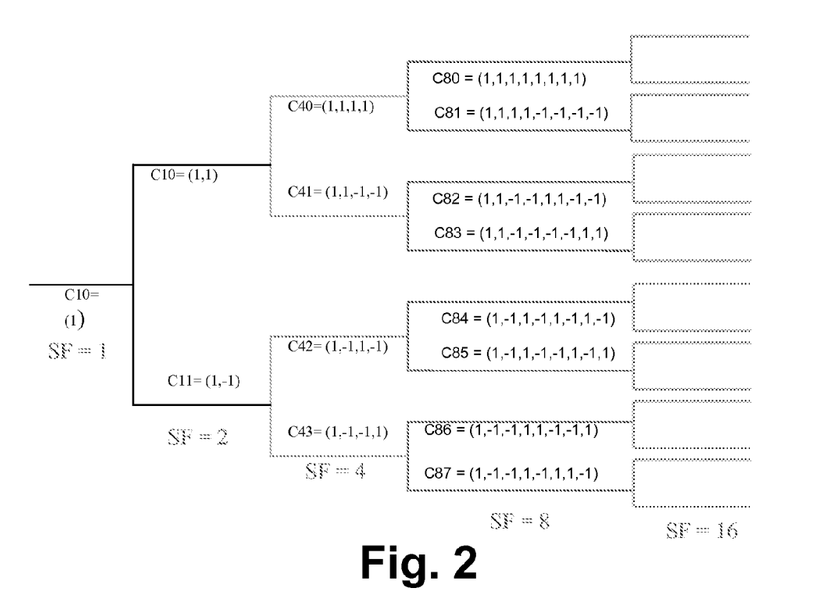
FIG. 2 illustrates orthogonal variable spreading factor (OVSF)

The UMTS system uses wideband CDMA (code division multiplexing access) technology. The important notion for CDMA is spectrum spreading (refer to FIG. 1). The real information spectrum 10 is spread via a OVSF (orthogonal variable spreading factor) code to produce a spread spectrum signal 14. The OVSF code 12 is shown in detail in FIG. 2.

Figure 3:
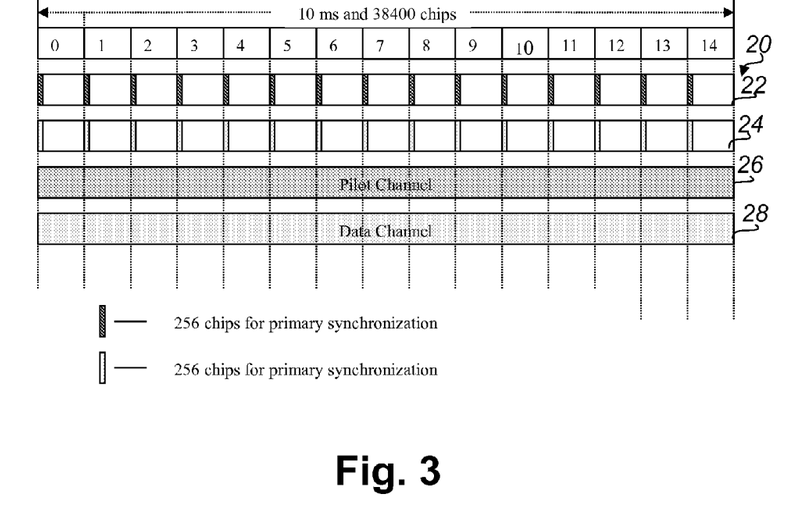
FIG. 3 illustrates 3GPP/UTMS channel structure.

Referring to FIG. 3, there is illustrated three major channels for the 3GPP/UMTS downlink. The first are the synchronization channels 20 including a primary synchronization channel (PSCH) 22 and a secondary synchronization channel (SSCH) 24. The second is a pilot channel 26 and the third is a data channel 28.

The primary synchronization channel (PSCH) 22 and secondary synchronization channel 24 are used by a terminal to determine the BTS timing information and scrambling code information so that it can access the system.

The pilot channel 26 allows the terminal to do finger detection, channel estimation and SNR estimation to decode information.

Figure 4:
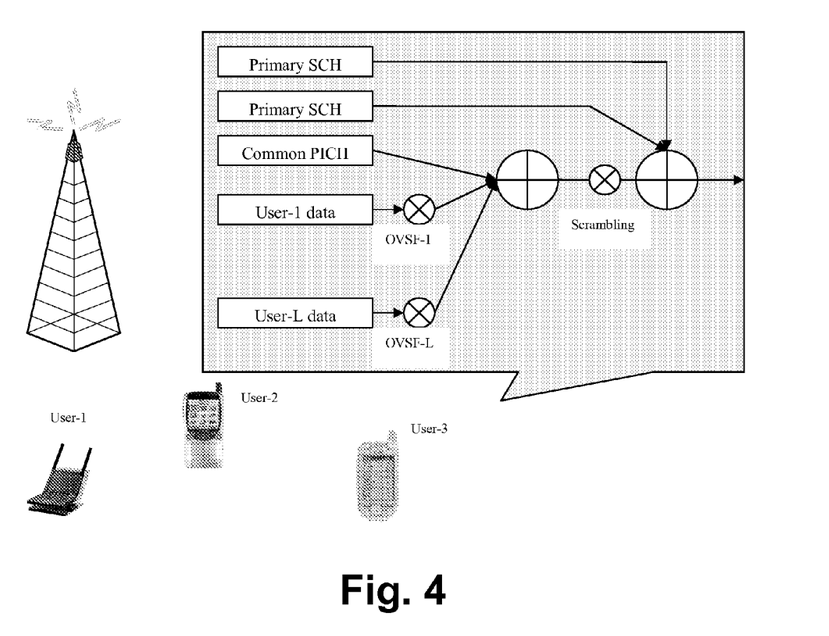
FIG. 4 illustrates 3GPP/UTMS signal structure.

Data channels 28 are used to carry user information such as voice, packet/circuit data. These channels are superposed to form a 3GPP/UMTS signal before transmission as shown in FIG. 4.

The PSCH/SSCH have only 256 chips in each slot and the rest of each slot are filled by zeros. The evolution of 3GPP/UMTS, such as HSDPA, HSOPA and LTE is still following this basic 10 ms frame structure to maintain compatibility.

WiMax System and Frame Structure

WiMax system is defined by IEEE 802.16x standards and uses Orthogonal Frequency Division Multiplexing (OFDM) technology. A typical OFDM transmitter and receiver are illustrated respectively in FIG. 5 and FIG. 6.

Figure 5:
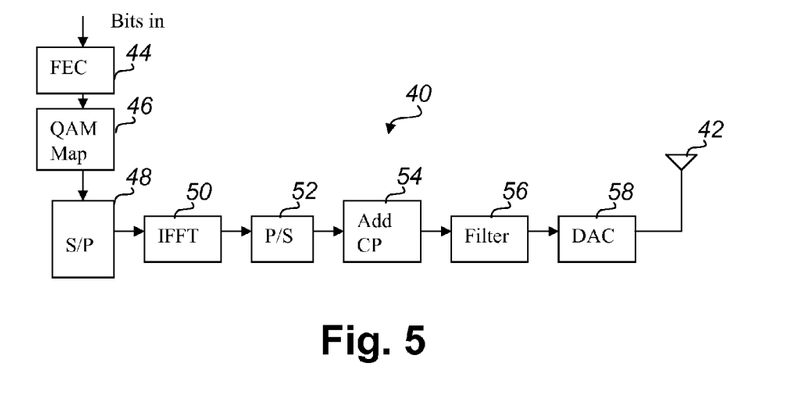
FIG. 5 illustrates a typical OFDM transmitter.

Referring to FIG. 5, there is illustrated a transmitter 40 with one antenna 42. Information bits are fed into a forward error correction (FEC) encoder 44 that encodes the bits with some redundancy built in. The coded bits are then mapped 46 to constellation symbols. After a serial to parallel conversion 48, an inverse fast Fourier transform (IFFT) 50 with appropriate size (say 64 for WiFi, 1024 for WiMax) is applied. The output of IFFT 50 is then converted back to serial format 52 and a cyclic prefix (CP) is usually appended in front 54 so that the linear convolution can be automatically translated into a cyclic convolution after removing it in the receiving end. A windowing filter 56 is applied for the data blocks to control the adjacent emission masks to meet the specification requirement. A digital to analogue converter (DAC) 58 up converts the signal to analog format, which is amplified (not shown) and radiated from the antenna 42.

Figure 6:
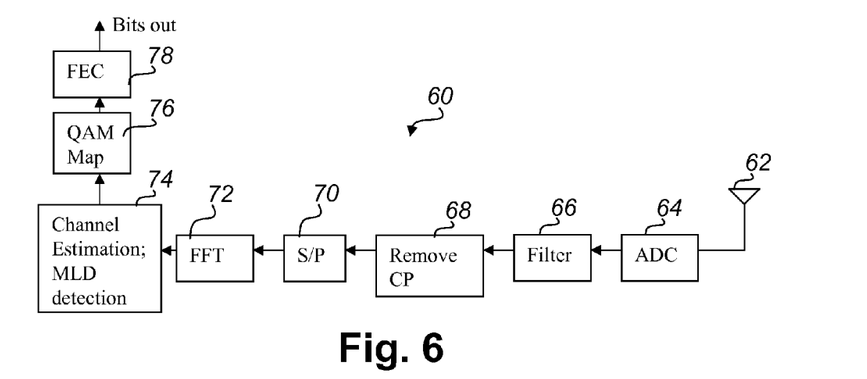
FIG. 6 illustrates a typical OFDM receiver.

Referring to FIG. 6, there is illustrated a receiver 60 with one antenna 62. In the receiving end, the received signal is down converted and digitized by an analogue to digital converter (ADC) 64. A matching filter 66 can be applied to maximize the signal gain. The digitized data is fragmented accordingly and the portion of CP is removed 68. The fragmented data is then converted to a format 70 suitable for fast Fourier transform (FFT) 72. After FFT 72, the multipath channel is estimated 74 via known sequences (such as pilots, training sequence, preamble etc) and a maximum likelihood detection is usually applied to map the received data back to constellation symbol level 76 either in hard bit or soft bits, which are then input to a FEC decoder 78.

For a 5 MHz spectrum for example, the Nyquist sampling rate specified in the standard (Refer to [6]) is 5.6 MHz. In order to meet the spectrum mask, some guard tones (also commonly called subcarriers) are used when designing an OFDM symbol. The guard tones are not modulated therefore the transmitted OFDM signal spectrum power density is concentrated within the middle part of the RF channel. An example OFDM symbol design of WiMax with 5 MHz is illustrated in FIG. 7.

First, the 5.6 MHz spectrum 80 is divided into 512 pieces (also called subcarriers or tones) of 10.9315 kHz each, which is usually referred to as subcarrier spacing. The left-hand side 46 pieces 82 and right-hand side 45 pieces 84 are not used for transmission. These non-used pieces add up to 91*10.9315 kHz or roughly 0.995 MHz. Therefore only 5.6-0.995=4.6052 MHz 86 are actually being used. This may be adapted to fit within a 5 MHz band.

Figure 8:
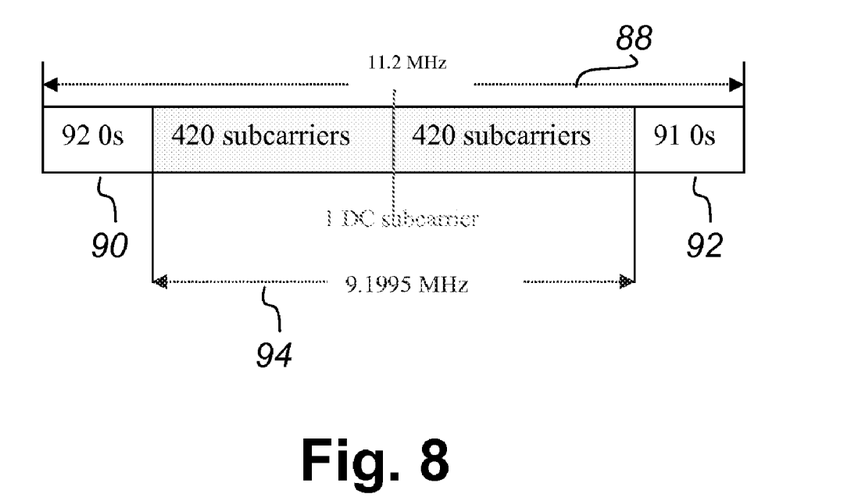
FIG. 8 illustrates an OFDM symbol design example of 10 MHz.

Similarly, an example for 10 MHz bandwidth is illustrated in FIG. 8. The 11.2 MHz spectrum 88 is divided into 1024 pieces (also called subcarriers or tones) of 10.9315 kHz each. The left-hand side 92 pieces 90 and right-hand side 91 pieces 92 are not used for transmission. The total spectrum being used 94 is 9.1995 MHz. This may be adapted to fit within a 10 MHz band.

Figure 7:
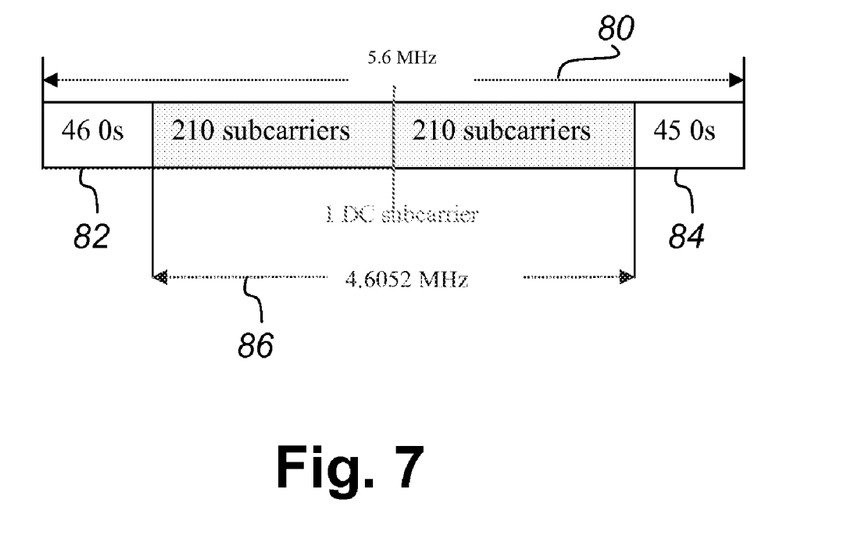
FIG. 7 illustrates an OFDM symbol design example of 5 MHz.

From the OFDM symbols design illustrated in FIGS. 7 and 8, we can see that OFDM system uses guard tones to shape its spectrum to restrict the adjacent channel interference. This is quite different from conventional TDMA and CDMA systems where they use shaping filters such as Gaussian filter or RRC (Root Raised Cosine) to shape the spectrum within the specified masks.

Figure 9:
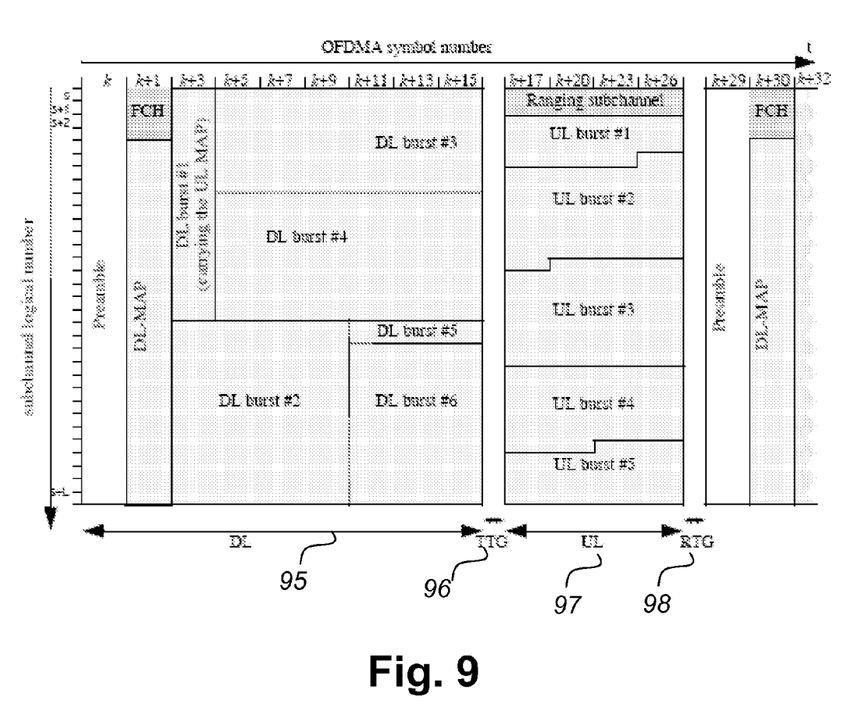
FIG. 9 illustrates WiMax/IEEE 802.16e TDD frame structure.

An example of WiMax/IEEE 802.16e TDD frame structures is illustrated in FIG. 9. In this example, every 5 ms is divided into four parts
(1) DL (downlink) 95 part in which the BTS transmits and terminal receives
(2) TTG: Transmit/receive transmission gap 96.
(3) UL (uplink) part 97 in which terminal transmits and BTS receives
(4) RTG: Receive/transmit transition gap 98.

SUMMARY OF THE INVENTION

An object of the present invention is to provide improved methods and apparatuses for wireless.

In accordance with an aspect of the present invention there is provided a A method of sharing a wireless spectrum compromising the steps of establishing the communication channels within the allocated bandwidth using a first protocol, determining the unused bandwidth within the allocated bandwidth, and establishing the further communication channels within the unused allocated bandwidth using a second protocol.

In accordance with another aspect of the present invention there is provided a system for sharing a wireless spectrum compromising a first transceiver for establishing the communication channels within the allocated bandwidth using a first protocol, a broker for determining the unused bandwidth within the allocated bandwidth, and a second transceiver for establishing the further communication channels within the unused allocated bandwidth using a second protocol.

BRIEF DESCRIPTION OF THE DRAWINGS

The present invention will be further understood from the following detailed description with reference to the drawings in which.

DETAILED DESCRIPTION OF THE PREFERRED EMBODIMENT

In accordance with an embodiment of the present invention, we propose a network oriented software defined radio system to allow different wireless standards such as 3GPP/UMTS and WiMax to share a spectrum.

Figure 10:
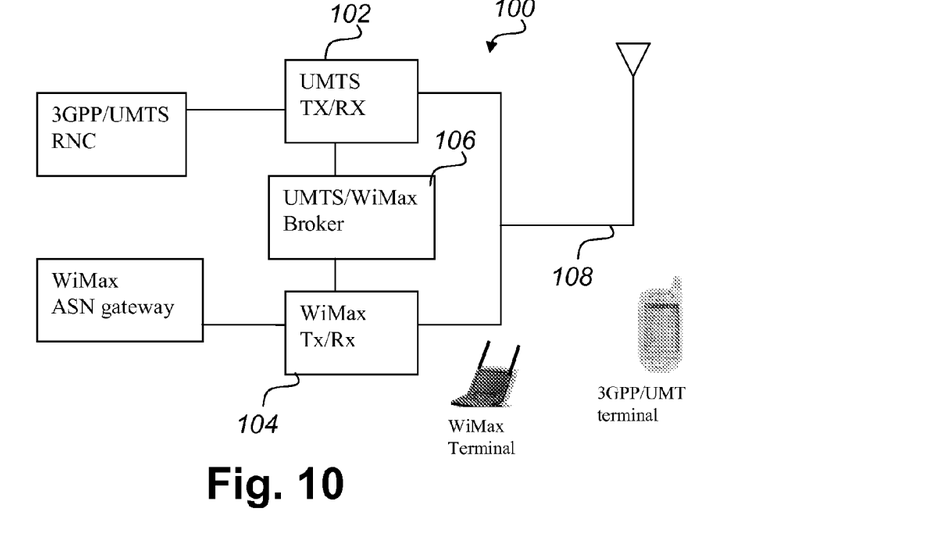
FIG. 10 illustrates a hybrid 3GPP/WiMax BTS in accordance with an embodiment of the present invention.

Referring to FIG. 10 there is illustrated a hybrid 3GPP/WiMax BTS in accordance with an embodiment of the present invention. The hybrid 3GPP/WiMax BTS 100 includes a 3GPP/UMTS BTS transceiver system 102 and a WiMax BTS transceiver system 104. Common components and peripherals are shared as much as possible. These components and peripherals include antennas, RF cables, PA, tower, cabinet, alarming system, OAM system. These two systems also share spectrum by making rendezvous or by a site-by-site scheduler to dynamically allocate the time slots or frequency sub-bands to each system. The time slot granularity adapts to each system's requirements and frequency sub-bands to meet standards requirements.

For 3GPP/UMTS and WiMax for example, the time slot granularity can be 10 ms. However, there is no need to require both systems to have the same sampling rate (3GPP UMTS 3.84 MHz and WiMax is 5.6 MHz or 11.2 MHz) or a very wide band radio to adapt to different bandwidth or sampling rate. But preferably they use the same piece of spectrum, for example 5 MHz and its multiples. The BTS software is responsible for configuring the system so that both spectrum masks meet their respective standard specifications. Consequently, there are no hardware modifications needed on the terminal side, thereby allowing terminal designs to remain flexible.

The hybrid 3GPP/WiMax BTS 100 includes both 3GPP transceiver system 102 and WiMax transceiver system 104. In one scenario, 3GPP/UMTS system 102 is deployed first and WiMax system 104 is deployed subsequently. Thus, the service providers may use UMTS system for latency sensitive services such as voice while using WiMax to serve for latency less sensitive users such as Internet access. Between these two transceiver systems, there is a 3GPP-WiMax broker 106 which is responsible for managing and for monitoring the radio resources allocation status with QoS priority and then making time slots and frequency sub-bands allocation and rendezvous for each individual system.

Figure 11:
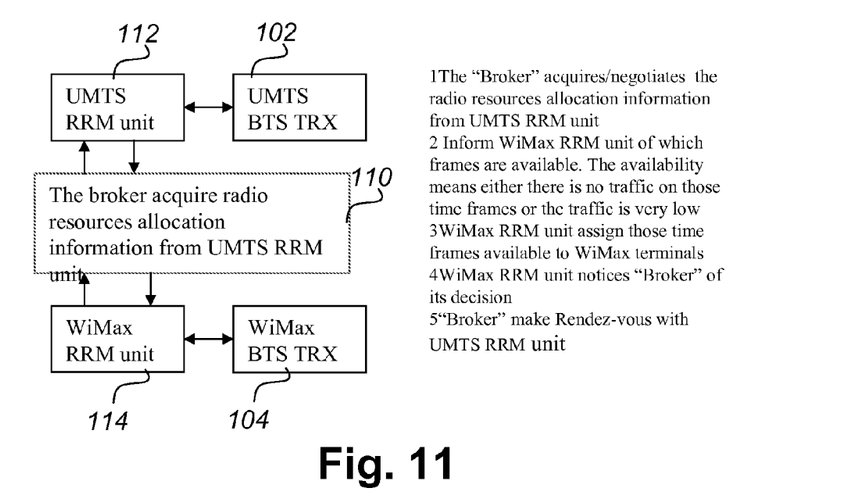
FIG. 11 illustrates spectrum sharing procedures in accordance with another embodiment of the present invention.

Referring to FIG. 11, spectrum sharing procedures are illustrated. The broker functionality 110 is to co-ordinate with RRM (radio resource management) units 112 and 114 residing in UMTS and WiMax systems 102 and 104, respectively. The two systems can each operate stand alone or can be cooperate with each other to share a piece of spectrum and to maximize overall system spectrum efficiency and to optimize services. In FIG. 11, we have provided brief procedures on how to implement this broker in practice, repeated herein below.

The Broker 110 acquires/negotiates the radio resources allocation information from UMTS RRM unit 112

The Broker 110 informs WiMax RRM unit 114 of which frames are available. The availability means either there is no traffic on those time frames or the traffic is very low WiMax RRM unit 114 assigns those time frames available to WiMax terminals WiMax RRM unit 114 notices the Broker 110 of its decision The Broker 110 makes Rendezvous with UMTS RRM unit 114

Figure 12:
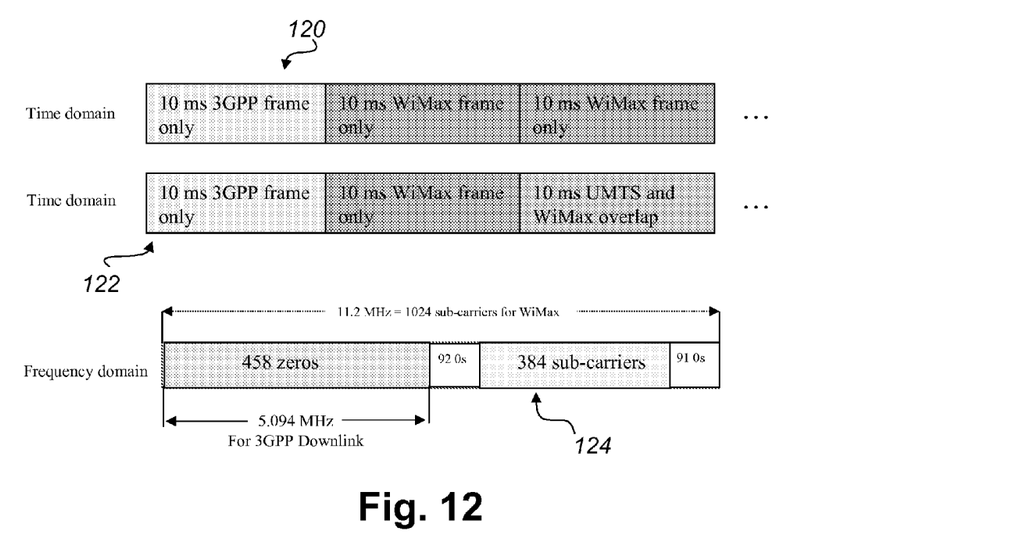
FIG. 12 illustrates examples of 3GPP/WiMax downlink timesharing.

Referring to FIG. 12, there are illustrated three examples of the possible spectrum sharing configuration. The first example 120 shows a purely time division sharing scheme, i.e. when 3GPP/UMTS occupies a time slot, the WiMax is idle. The second example 122 shows a mixture, i.e. both systems can share a spectrum by time division or signal overlap in both time and in frequency. The third example 124 shows a purely frequency division sharing scheme, i.e. OFDM sub-carriers will be stuffed by zeros where 3GPP/UMTS signal appears.

Despite the above description of how the two systems can well co-exist in time, this does not work yet in practice due to the fact that different standards have different requirements in spectrum. The 3GPP/UMTS spectrum mask is more stringent than the spectrum mask for WiMax (refer [4], [5] and [6]). Moreover, 3GPP/UMTS spectrum mask has no flexibility due to the RRC shaping filter. Consequently, we propose to force the WiMax BTS radio to meet 3GPP/UMTS spectrum mask requirements. One way of doing this is to stuff more zeros on both sides of the useful spectrum. This can be done via the broker 110 always reserving those tones and stuffing zeros into those tones for WiMax transmission.

Figure 13:
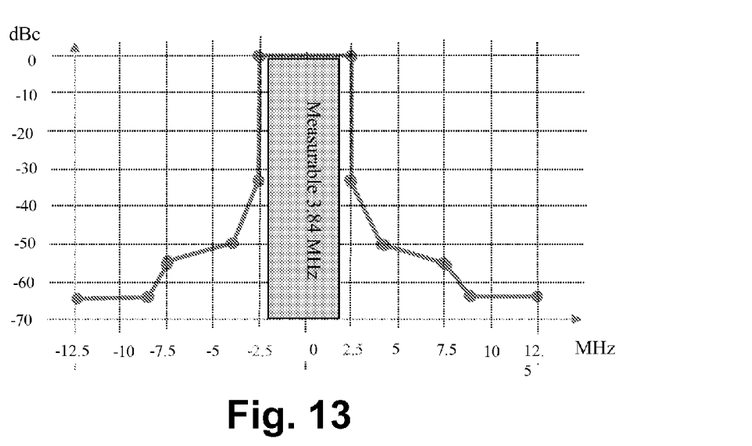
FIG. 13 graphically illustrates a 3GPP/UTMS spectrum mask.

Referring to FIG. 13 there is illustrated the 3GPP/UMTS spectrum mask requirement. 3GPP/UMTS uses a RRC with rollover factor 0.22.

Figure 14:
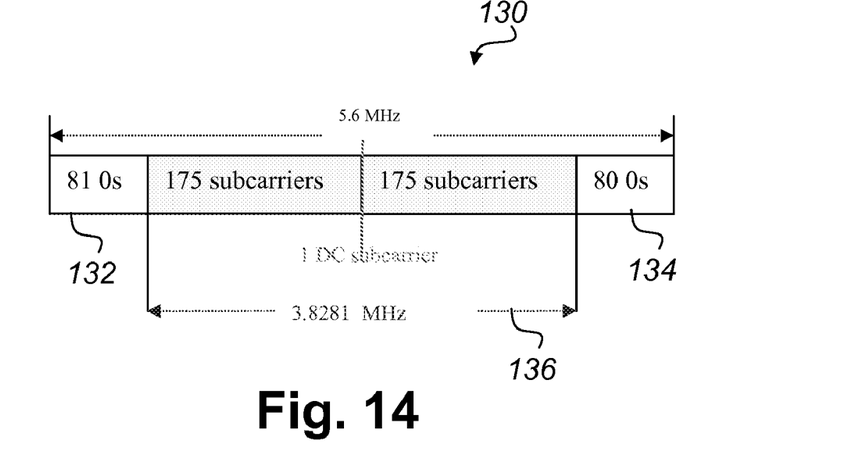
FIG. 14 illustrates an example of a WiMax OFDM symbol structure to share 5 MHz with illustrates examples of 3GPP/UTMS in time domain.

Referring to FIG. 14 there is illustrated an example of a WiMax OFDM symbol structure to share 5 MHz with illustrates examples of 3GPP/UTMS. In order for a WiMax signal to be able to share the same 5 MHz spectrum, the broker 110 needs to reserve the tones on the edges so that the WiMax measurable spectrum falls well within the 3GPP/UMTS spectrum mask. For example, the broker 110 reserves at least 35 tones on each edge of the spectrum and those tones are stuffed with 0s. In this way the WiMax symbol structure for a 5 MHz system as shown in FIG. 7 can be modified to work with 3GPP/UTMS as shown in FIG. 14. The modified symbol 130 includes a left-hand side of 81 tones 132 and right-hand side of 80 tones 134 that are not used for transmission of data. This leaves 350 subcarriers, 3.8281 Mhz 136 for WiMax data.

Figure 15:
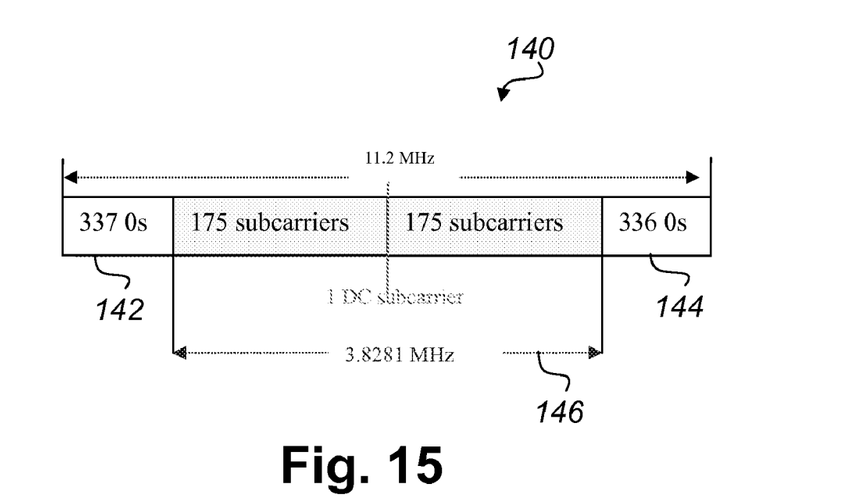
FIG. 15 an example of a WiMax OFDM symbol structure to share 10 MHz with illustrates examples of 3GPP/UTMS in time domain.

Referring to FIG. 15 there is illustrated an example of a WiMax OFDM symbol structure to share 10 MHz with illustrates examples of 3GPP/UTMS. Similarly, if a WiMax BTS is designed for a 10 MHz spectrum, the broker 110 needs to reserve 245 tones in each side and so that the OFDM symbol structure (shown in FIG. 8) can be modified as illustrated in FIG. 15. The modified symbol 140 includes a left-hand side of 327 tones 142 and right-hand side of 326 tones 144 that are not used for transmission of data. This leaves 350 subcarriers, 3.8281 Mhz 136 for WiMax data.

On terminal side, there may be two main scenarios

First, the terminal is either designed as dedicated 3GPP/UMTS terminal or as a dedicated WiMax. Then the terminal goes through its standard procedures for communication with a BTS. Hence, for a 3GPP/UMTS terminal, it starts looking for primary synchronization channel and secondary synchronization channel to access the 3GPP/UMTS system and requests radio resources, then starts a communication. For a WiMax terminal, it first starts looking for a preamble to synchronize with the BTS, then decodes the BTS parameter information, then accesses the system and requests radio resources for communication. Consequently, both 3GPP/UMTS terminals and WiMax terminals are fooled into believing they are communicating with their respective systems without knowing what is going on in BTS side. If the time slots/frames or frequency sub-bands allocated to 3GPP/UMTS terminal are separate from those WiMax terminals as shown in the first example 120 and third example 124 in FIG. 12, the 3GPP/UMTS signal and Wimax signal will not interfere with each other due to time division or frequency division. However, if their time slots/frames overlap with each other as illustrated in the second example 122 of FIG. 12, then the 3GPP/UMTS terminal will treat the WiMax signal as in-band interference. Similarly, the WiMax terminal will treat the 3GGP/UMTS signal as in-band interference.

Figure 16:
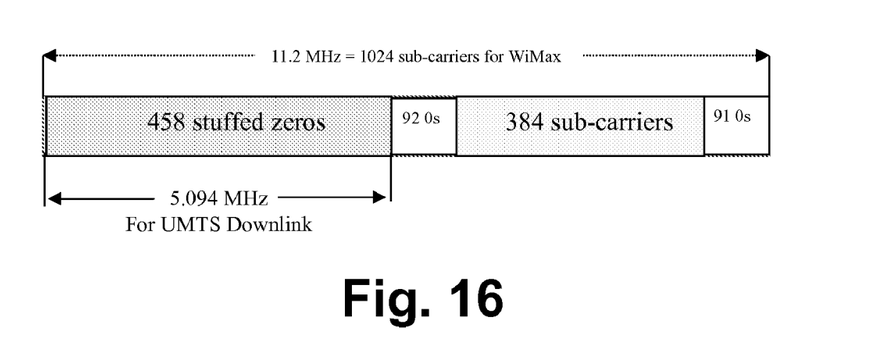
FIG. 16 an example of WiMax system to share a 10 MHz spectrum with 3GPP/UMTS system in frequency domain.

Secondly, if a terminal is designed as a dual mode, that is it can demodulate/decode both 3GPP/UMTS signals and WiMax signals, the terminal design can be significantly simplified and the performance can be enhanced in terms of:
a. system access procedures which can be faster
b. spectrum saving (only need either preamble or pilot but not both)
c. One unified modem in BTS side and in terminal side.
d. If UMTS/3GPP and WiMax signal are overlapped, the decoding will first decode the strongest signal, re-modulate it and then filter it by the estimated multipath channel and then subtract it from the received data and then decode the second signal.
e. If UMTS/3GPP and WiMax signals are frequency division multiplexed as shown in FIG. 16 and they are sharing one front-end/RF in receiver end, then the guard band (a spectrum waste) can be minimized to accommodate two systems via digital domain signal subtraction, i.e. UMTS receiver can remove the WiMax signal interference and WiMax receiver can remove the UMTS signal interference by first decode the interference signal and re-modulate the signal and subtract it from the desired signal.

References

[1] J. Mitola, The software radio architecture, IEEE Communication magazine, Vol. 33, PP. 26-38, May, 1995.
[2] US, Federal Communications Commission, First Report and Order, "Authorization and Use of Software Defined Radios", September 2001, www.fcc.gov
[3] 3GPP TS 25.211, re1.99
[4] 3GPP TS 25.101, re1.5, UE radio transmission and reception (FDD)
[5] 3GPP TS 25.104, v3.0.0, UTRA (BS) (FDD) Radio transmission and reception
[6] IEEE STD 802.16e-2005

Numerous modifications, variations and adaptations may be made to the particular embodiments described above without departing from the scope patent disclosure, which is defined in the claims.

What is claimed is:

1. A method of sharing a wireless spectrum comprising the steps of:
   a. a first transceiver establishing communication channels within an allocated bandwidth using a first protocol of a first network, the first protocol having a fixed bandwidth requirement per channel and a first spectrum mask;
   b. the first transceiver disclosing to a broker the unused bandwidth within the allocated bandwidth, the broker reserving a first subset of a plurality of subcarriers and permitting use of a second subset of the plurality of subcarriers to coexist with the first spectrum mask; and
   c. a second transceiver establishing further communication channels using the second subset of the plurality of subcarriers for a second protocol of a second network, the second protocol having a variable bandwidth requirement.

2. A method as claimed in claim 1 wherein a predetermined amount of bandwidth is allocated to the first protocol.

3. A method as claimed in claim 2 wherein the first protocol is UMTS and the second protocol is WiMax.

4. A method as claimed in claim 2 wherein the step of establishing the further communication channels includes the step of using zero stuffing or tones reservation to force WiMax/OFDM symbol to meet a 3GPP/UMTS spectrum mask.

5. A method as claimed in claim 1 wherein the step of brokering is in dependence upon a master-slave spectrum sharing.

6. A method as claimed in claim 5 wherein the first protocol is UMTS and the second protocol is WiMax TDD system or WiMax FDD system.

7. A method as claimed in claim 6 wherein the step of brokering includes the steps of standing by and monitoring UMTS traffic, and whenever resources are idle or traffic are low, allocating to bandwidth WiMax traffic.

8. A method as claimed in claim 1 wherein the step of brokering is in dependence upon time division multiplexing.

9. A method as claimed in claim 8 wherein the step of brokering overlaps a WiMax signal with a UMTS.

10. A method as claimed in claim 1 wherein the step of brokering is in dependence upon frequency division multiplexing.

11. A method as claimed in claim 10 wherein the step of brokering is to stuff zeros in OFDM sub-carriers where another wireless system signal may appear.

12. A system as claimed in claim 8 wherein the broker overlaps a WiMax signal with a UMTS signal.

13. A system as claimed in claim 10 wherein the broker determines how many sub-carriers need to be stuffed by zeros so that another wireless system can be accommodated to share a spectrum with an OFOM based system such as WiMax/802.116x.

14. A method as claimed in claim 1 wherein the first and second transceivers share a common RF front end.

15. A system for sharing a wireless spectrum comprising:
   a. a first transceiver for establishing the communication channels within the allocated bandwidth using a first protocol of a first network, the first protocol having a fixed bandwidth requirement per channel and a first spectrum mask;
   b. a broker coupled to the first transceiver for receiving from the first transceiver a disclosure of the unused bandwidth within the allocated bandwidth, the broker reserving a first subset of a plurality of subcarriers and permitting use of a second subset of the plurality of subcarriers to coexist with the first spectrum mask; and
   c. a second transceiver coupled to the broker for receiving permission to use the second subset of subcarriers of the plurality of subcarriers and establishing the further communication channels using the second subset of subcarriers for a second protocol of a second network, the second protocol having a variable bandwidth requirement.

16. A system as claimed in claim 15 wherein a predetermined amount of bandwidth is allocated to the first protocol.

17. A system as claimed in claim 16 wherein the first protocol is UMTS and the second protocol is WiMax.

18. A system as claimed in claim 17 wherein the second transceiver for establishing the further communication channels includes the means for using zero stuffing or tones reservation to force WiMax/OFDM symbol to meet a 3GPP/UMTS spectrum mask.

19. A system as claimed in claim 18 wherein broker determines bandwidth allocation in dependence upon a master-slave spectrum sharing.

20. A system as claimed in claim 19 wherein the first protocol is UMTS and the second protocol is WiMax.

21. A system as claimed in claim 20 wherein the broker includes means for monitoring UMTS traffic and allocating bandwidth to WiMax traffic whenever resources are idle or traffic are low.

22. A system as claimed in claim 18 wherein the broker allocates bandwidth in dependence upon time division multiplexing.

23. A system as claimed in claim 15 wherein the first and second transceivers share a common RF front end.

* * * * *